INFORMATION STORAGE APPARATUS

Filed March 22, 1960

INVENTOR
JULIAN ALBERT WALTER DAVIE

BY Hane and Nydick
ATTORNEYS

United States Patent Office 3,117,307
Patented Jan. 7, 1964

3,117,307

INFORMATION STORAGE APPARATUS

Julian Albert Walter Davie, Stevenage, England, assignor to International Computers and Tabulators Limited, London, England Filed Mar. 22, 1960, Ser. No. 16,732
Claims priority, application Great Britain Apr. 3, 1959
3 Claims. (Cl. 340—173)

Figures 1, 2:
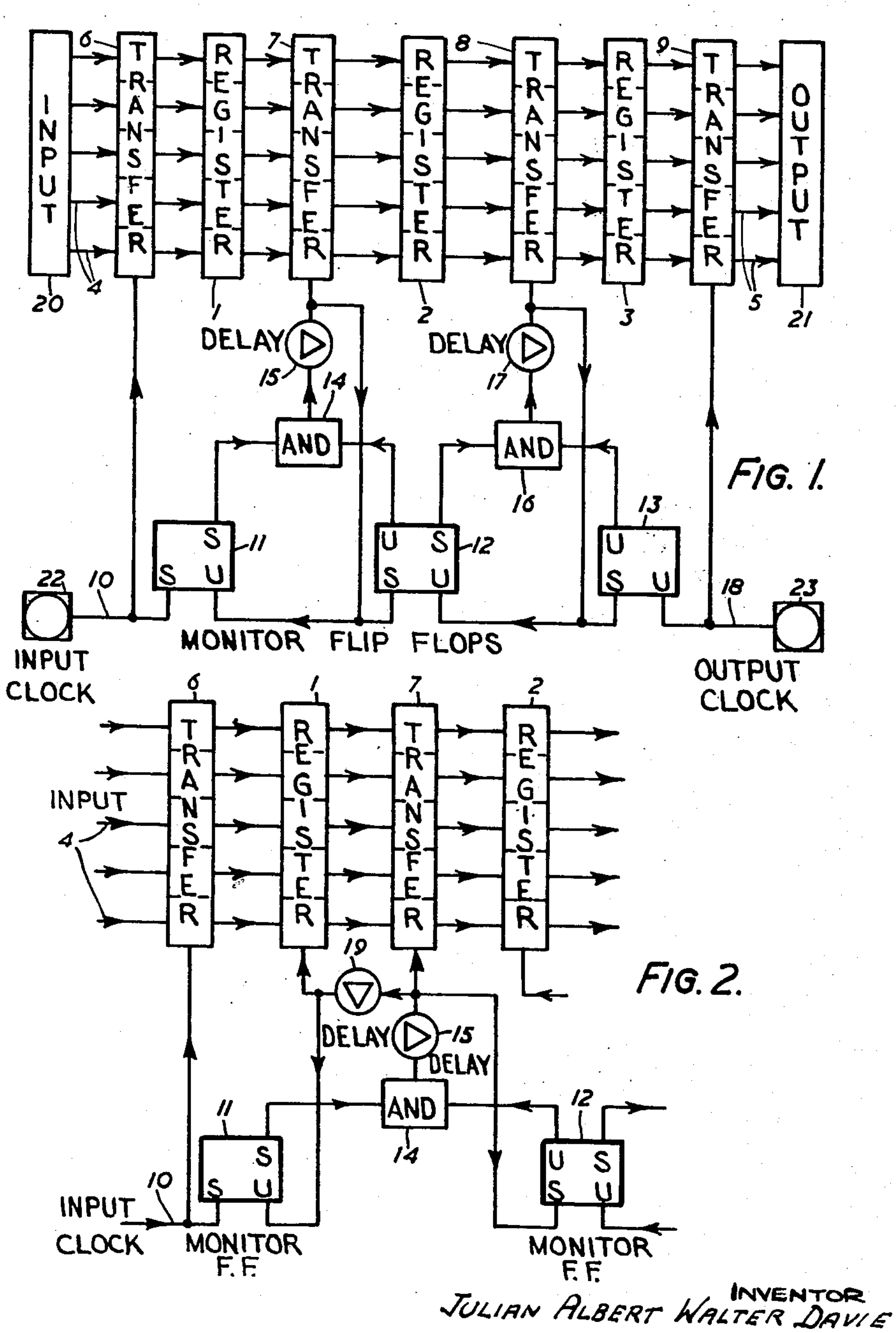

This invention relates to information storage apparatus.

Shifting register storage devices are well known. Such a device may consist, for example, of a number of flip-flop stages connected in chain formation through transfer stages. A shift pulse applied to all the transfer stages simultaneously causes the setting of each flip-flop to be transferred to the next higher flip-flop in the chain. Information is read in serially to the lowest flip-flop and is read out serially from the highest flip-flop.

The register may be loaded with information at one speed and subsequently unloaded at a different speed, by employing two separate trains of shifting pulses. It will be apparent that the register must be fully loaded before read out can take place from the highest stage. Furthermore, the register must in general be capable of holding a block of information of substantial size, since loading and unloading takes place alternately. The requirement for a storage device with asynchronous read in and read out frequently arises in connection with buffer stores coupling a computer to the input and output devices, for example. Thus it would be necessary to store eighty columns of information in the shifting register used for coupling an eighty-column serial card reader to a computer. Such a storage device is expensive.

It is an object of the invention to provide a multi-stage storage device with provision for simultaneously and independently reading information into one stage, reading information out of another stage and transferring information between other stages.

It is a further object of the invention to provide a multi-stage storage device in which each stage has an associated monitoring device which controls transfer of information between the stages independently of the timing of read in and read out of information.

According to one aspect of the present invention, electronic information storage apparatus comprises a number of information storage stages arranged in succession, each stage comprising a bistable storage element arranged to store an item of information, means operable to transfer a stored information item from each storage stage to the next in the succession, means for entering an information item into the initial storage stage, means for reading a stored information item out of the final storage stage and control means responsive to the storage of an item by a stage automatically to operate the transfer means to advance the item through the succession of stages to that latest stage in the succession which is not already storing an information item.

According to another aspect of the present invention, electronic information storage apparatus comprises a number of information storage stages arranged in succession, each stage comprising an information register having a like number of bistable storage elements each arranged to store a single information item, transfer means operable to transfer stored information items from the elements of one register to the corresponding elements of the next register in the succession, means for entering items of information in parallel to the elements of the initial register of the succession, means for reading out in parallel the stored information items from the final register of the succession and control means responsive to the storage of items in a register automatically to operate the transfer means to advance the items through successive registers to that latest register in the succession which is not already storing items of information.

The invention will now be described, by way of example, with reference to the accompanying drawing, in which:

FIGURE 1 is a block schematic diagram of one form of information storage device, and FIGURE 2 is a block schematic diagram of a modified form of storage device.

A three stage storage device is shown in FIGURE 1. The three stages are formed by registers 1, 2 and 3. The registers are connected in chain formation between input lines 4 and output lines 5 by information transfer devices 6 to 9. Each register consists of five separate bi-stable storage elements. Each storage element may comprise, for example, a conventional valve or transistor flip-flop, or a square loop magnetic storage core. Each transfer device includes five transfer circuits each transfer circuit being effective to transfer the setting of one storage element in one register to a corresponding storage element in the next register. The transfer units are effective to transfer information only when they receive a transfer control pulse.

Items of information on the lines 4 are derived from an input device 20, which may, for example, be a further register similar to the register 1, 2 and 3. Such an input device may, for example, be part of an information processing apparatus such as a computer and in this case the items of information may be derived from other operations performed by the apparatus. In a similar way the output lines 5 carry information items to be passed to an output device 21, which may be, for example a printing or other recording device arranged to record the results of computation operations. It will be appreciated that the registers 1, 2 and 3 thus form a storage device for information items to be passed from the input device 20 to the output device 21 and it will therefore be apparent that the arrangement is suitable for other transfers of information, such as is required, for example, in entering information from a source into the computer, or for transferring information items from one information processing apparatus to another.

It is assumed that five items of information to be stored are represented by voltage levels on the five input lines 4. These five bits may be the five code elements representing a character in the usual five element telegraphic code, for example as in the case where the input device 20 is arranged to sense information items from a perforated tape. The voltage on each input line would then depend on whether or not a sensing device was sensing a perforation in the paper tape. Information is entered into the register 1 by the application of an input clock pulse on line 10 from an output clock pulse generator 22. The clock pulse operates the transfer unit 6 to set the five storage elements of the register 1 in accordance with the voltages present on the corresponding ones of the input lines 4.

The input clock pulse is also applied to the setting input of an indicator formed by a monitor flip-flop 11 associated with the register 1. Further indicators are associated with the other registers, and are shown in the figure as monitor flip-flops 12 and 13 associated with the registers 2 and 3, respectively. It is arranged that each monitor flip-flop is switched to the set state if information has been transferred into the associated register and is switched to the unset state if the previously stored information has been transferred out of the associated register.

The state of the monitor flip-flops controls transfer of information within the storage device. Information is transferred from one register to the following register if that register is not already storing information. The timing of such internal transfers is independent of the timing of the input clock pulses. However, the transfer time must not be greater than the time between successive input clock pulses to ensure that the register 1 is always free to receive the input signals.

It will be assumed that the storage device is empty initially. An AND gate 14 is controlled by the set output of the flip-flop 11 and the unset output of the flip-flop 12. Following the usual convention, the output from flip-flop 11 will be low and the output from flip-flop 12 will be high, since both flip-flops are in the unset state. When information is transferred to the register 1, the flip-flop 11 is simultaneously switched to the set state. The set output becomes high and the AND gate 14 produces an output since both inputs are now high. This output is fed to the transfer device 7, via a delay circuit. This acts on the transfer device 7, in the same manner as the input clock pulse on line 10 acted on the transfer circuit 6. Hence the information is transferred from register 1 to register 2 via the transfer device 7. The delay circuit 15 provides sufficient time for the storage elements of register 1 to become stabilised after the information has been entered before the information is read out again to register 2. This delay circuit need not be used if the switching time of the flip-flop 11 and the inherent delay of the AND gate 14 are together appreciably longer than the switching time of the storage elements of the register.

It is assumed in this case, that the storage elements of the registers 1 to 3 are of a kind which are reset when data is read out from them. The transfer thus leaves the register 1 reset and the information in register 2. The output of the delay circuit 15 is also applied to the flip-flop 11 to return it to the unset state, and to the flip-flop 12 to switch it to the set state.

An AND gate 16 is controlled by the monitor flip-flops 12 and 13. Consequently, the AND gate 16 provides an output as soon as the flip-flop 12 switches to the set state. This output is applied to the transfer device 8 via delay circuit 17. The transfer device 8 transfers the information from register 2 to register 3. Thus the information has been transferred to the register 3, which acts as the output stage of the storage device, independently of the input clock pulses. The output from the delay circuit 17 is also applied to the flip-flop 12 to return it to the unset state and to the flip-flop 13 to switch it to the set state.

The stored information is read out by applying an output clock pulse on line 18 to the transfer device 9, which will produce signals, on the output lines 5, corresponding to the states of the storage elements of the register 3. The output clock pulse is also applied to the flip-flop 13 to switch it to the unset state, since the information is being cleared from the register 3.

The information representing signals on the lines 5 are thus passed to the output device 21 under control of output timing pulses occurring on the line 18. These pulses are generated by an output timing clock pulse generator 23 which is associated with the output device 22 and is arranged to generate a clock pulse train in synchronism with the operation of the output device. It will be apparent, therefore, that the operation of the output device may be asynchronous with the entry of information items from the input device. However, provided that the rate at which information items are read out of the register 3 is sufficiently great so that the storage device is not completely filled during a succession of information transfers the entry of information items is unaffected by the reading out of stored items.

The relative rates of entry and reading out may, for example, be such that a second input clock pulse may occur before the first output clock pulse occurs. This will cause the entry of further information into the register 1. This new information will then be transferred to register 2 under the joint control of the flip-flops 11 and 12 as previously explained. The flip-flop 13 is already set as a result of the entry of the original information into the register 3. The AND gate 16 will therefore be receiving one low input and, in consequence, the new information will not, at this time, be transferred to register 3. However, the new information will be transferred to register 3 as soon as this register has been cleared and the flip-flop 13 has been unset by an output clock pulse.

A modified form of circuit is shown in FIGURE 2. This circuit is suitable for register storage elements which requires to be separately reset. The output from the delay circuit 15 is applied directly to the transfer device 7 and the flip-flop 12 as in FIGURE 1. However, the output is also applied through a further delay circuit 19 to reset the register 1 and the unset flip-flop 11. Thus, the storage elements of the register are reset after the information has been transferred to the register 2. The other register stages are modified in a similar manner.

It will be appreciated that the basis of the storage device is that an item of information entered at the input is automatically transferred from one register stage to the next towards the output and the transfer is halted by the item reaching the output stage or by the next stage being already occupied. The timing of the input and output clock pulses may be quite independent provided that, in the present example, the output does not fall behind the input by more than three pulses. It will be appreciated that more intermediate register stages, similar to the register 2, may be provided to increase the permissible lag of the output pulses on the input pulses. However, the total number of register stages need never be greater than the maximum lag which can occur between the output and the input pulses, irrespective of the number of items being fed to the initial stage of the storage device, because of the automatic transfer of information towards the final stage of the storage device. It will also be appreciated that the number of storage elements in each register is determined by the number of bits simultaneously presented at the input. For example, in the simplest case, where the input consists of a serial binary number, each stage of the storage device consists of only a single storage element, whereas if the information presented at the input consists of a forty digit binary number applied in parallel form, each stage of the device consists of a register having forty storage elements.

A conventional rectangular hysteresis loop magnetic storage core is an example of a storage element which is reset by reading out and is therefore suitable for use in the arrangement of FIGURE 1. Each stage of the transfer device 7, for example, comprises a circuit associated with the storage element and consisting of two windings coupled to the storage core forming the corresponding storage element of the register 1. One winding receives the output signal from the delay circuit 15 and is connected in such a sense that it tends to reset the core. If the core was previously set, an output signal from the circuit 15 switches the core and an outpjut pulse is generated in the second winding, which is connected to an input winding on the core forming the corresponding storage element of register 2. This output pulse produces a current in the input winding which switches the core of register 2 to the set state. An isolating diode may be included in the connection between the input and output windings to prevent any tendency for switching of the core of register 2 to effect the corresponding core of register 1. This arrangement operates in a similar way to the individual stages of conventional shifting registers using storage cores, and such an arrangement is described in United States Patent No. 2,881,412 with reference to FIGURE 1 thereof, and on page 192 of the publication "Digital Computer Components and Circuits" by R. K. Richards. However, it will be seen that instead of the usual arrangement in which shifting signals are applied in common to all the register stages, in the present case each stage receives a separate shifting or transfer signal derived from the appropriate AND gate such as 14.

The arrangement of FIGURE 1 may also be used with storage elements which are not reset on reading out, but are reset if necessary on reading in of new information. Each storage element may consist of a conventional flip-flop circuit, with the transfer circuit consisting of a double diode gate. Flip-flops coupled together by diode gates are shown in the form of a shifting register in British patent specification No. 738,269. A transfer pulse applied to the diode gate positively sets or resets one flip-flop to make the state the same as that of the other flip-flop to which the gate is connected. Thus separate resetting is unnecessary.

The arrangement of FIGURE 2 is suitable when certain kinds of dynamic flip-flops, for example, are used as storage elements. A dynamic flip-flop circuit using a transistor is shown and described in British patent specification No. 832,509. This circuit provides a pulse output only if it is storing a binary one and it has to receive an inhibiting input to cancel a stored binary one. Such an inhibiting input is provided by the resetting output from the delay circuit 19. A separate source of constant frequency clock pulses is required to allow the dynamic flip-flop to operate, but the transfer is effected by a diode AND gate controlled by the output of the delay circuit 15, for example, and the output of the dynamic flip-flop. The same arrangement is applicable when conventional flip-flops using valves or transistors, are used with a single diode AND gate as the transfer circuit, rather than the double diode gate referred to above. The transfer circuit passes a pulse only in transferring a binary one, and the flip-flops are reset after a transfer by the output from the delay circuit 19.

What I claim is:

1. A shifting register comprising a series of data storage stages for storing items of data; a corresponding series of two-state flip-flops normally in an unoperated state; a source of first input pulses; means for applying said first input pulses to the first flip-flop of the series to set it to an operated state; means operative in response to said first input pulses to enter items of data into the first storage stage; a source of second input pulses; means for applying said second input pulses to the last flip-flop of the series to set it to its unoperated state; means operative in response to said second input pulses to read out items of data from the final storage stage; a gating circuit connected to each pair of adjacent flip-flops and responsive to setting of the earlier flip-flop of the pair to its operated state and the later flip-flop of the pair to its unoperated state to generate a control signal; means for delaying said control signal and applying the delayed control signal to both flip-flops of the pair to reverse their states; and transfer means operative in response to the delayed control signal to transfer an item of data from the earlier to the later storage stage of the pair of stages corresponding to the pair of flip-flops.

2. A shifting register comprising a series of two-state data storage stages for storing items of data; a corresponding series of two-state flip-flops normally in an unoperated state; a source of first input pulses; means for applying said first pulses to the first flip-flop of the series to set it to an operated state; means operative in response to said first input pulses to enter items of data into the first storage stage; a source of second input pulses; means for applying said second input pulses to the last flip-flop of the series to set it to its unoperated state; means operative in response to said second input pulses to read out items of data from the final storage stage; a gating circuit connected to each pair of adjacent flip-flops and responsive to setting of the earlier flip-flop of the pair to its operated state and the later flip-flop of the pair to its unoperated state to generate a control signal; transfer means connected between each pair of adjacent storage stages and operable in response to the control signal to enter into the latter stage of the pair an item of data stored in the earlier stage of the pair; first means for delaying said control signal and applying said delayed signal to the later flip-flop of the pair to reverse its state and to the transfer means to operate the latter; and second means for delaying the control signal and applying the delayed signal to the earlier flip-flop of the pair to reverse its state and to the earlier corresponding storage state to erase the item of data therefrom.

3. Signal translating apparatus comprising a series of two state flip-flops normally in an unoperated state; first means for applying an input pulse to the first flip-flop of the series to set it to an operated state; second means for applying an input pulse to the last flip-flop of the series to set it to the unoperated state; a gating circuit connected to each pair of adjacent flip-flops in the series and responsive to setting of the earlier flip-flop of the pair to its operated state and the later flip-flop of the pair to its unoperated state to generate a control signal; means for delaying the control signal and applying said delayed control signal to the pair of flip-flops to reverse their states; a shifting register including a plurality of stages for storing data representing signals and a transfer circuit connected between each pair of adjacent statges and operative in response to said delayed control signal to transfer a signal representing an item of data from the earlier to the later stage of the pair; data input means for applying data representing signals to the first stage of the register and data output means for reading data representing signals from the last stage of the register.

References Cited in the file of this patent

UNITED STATES PATENTS

| | | |
|---|---|---|
| 2,842,682 | Clapper | July 8, 1958 |
| 2,863,138 | Hemphill | Dec. 2, 1958 |
| 2,881,412 | Loev | Apr. 7, 1959 |
| 2,985,835 | Stuart | May 23, 1961 |

Notice of Adverse Decision in Interference

In Interference No. 95,339 involving Patent No. 3,117,307, J. A. W. Davie, Information storage apparatus, final judgment adverse to the patentee was rendered Jan. 2, 1969, as to claims 1 and 3.

[*Official Gazette March 11, 1969.*]